Figure 1:
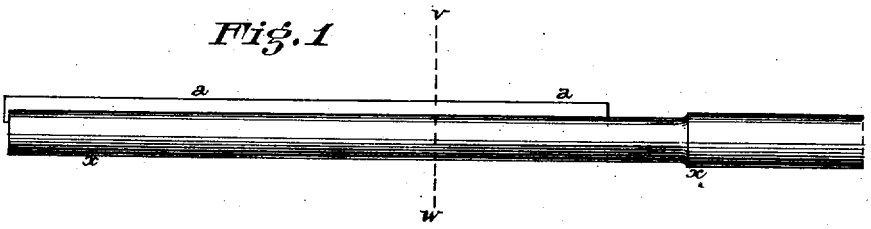

J. GREAVES,

Assignor of one-half to J. & J. DOBSON.

Condensing Cylinder for Carding Engines.

No. 9,477. Reissued Nov. 23, 1880.

Attests
Henry V. Buckley
Wm. H. Carson.

Inventor
James Greaves
by George E. Buckley
atty.

N. PETERS, PHOTO-LITHOGRAPHER, WASHINGTON, D.C.

UNITED STATES PATENT OFFICE.

JAMES GREAVES, OF PHILADELPHIA, PENNSYLVANIA, ASSIGNOR OF ONE-HALF TO JOHN DOBSON AND JAMES DOBSON, OF SAME PLACE.

CONDENSING-CYLINDER FOR CARDING-ENGINES.

SPECIFICATION forming part of Reissued Letters Patent No. 9,477, dated November 23, 1880.

Original No. 187,620, dated February 20, 1877. Application for reissue filed March 15, 1877.

DIVISION B.

*To all whom it may concern:*

Be it known that I, JAMES GREAVES, of Philadelphia, State of Pennsylvania, have invented certain new and useful Improvements in Condensing-Cylinders for Carding-Engines; and I do hereby declare the following to be a full, clear, and exact description of the same, reference being had to the annexed drawings, making part hereof.

My invention consists in the combination, in a carding-engine, of a condensing or rubber cylinder, a driving-wheel, and a polygonally-shaped horizontal shaft or spindle, the latter being adapted to be revolved and at the same time to be continuously reciprocated in a correspondingly polygonally-shaped bearing, said bearing and said shaft or spindle being of cast-iron or of metal of the same crystalline structure as cast-iron, and a continuously reciprocating rubber, substantially as and for the purposes hereinafter set forth; also, of the combination of a continuously-reciprocating rubber, a driving-wheel to turn said rubber, and a horizontal shaft or spindle connecting the two together, said shaft or spindle and the bearing in which it reciprocates being both made of cast-iron, or both of metal having the same crystalline structure as cast-iron, whereby the crystalline particles of one will resist the wear of the crystalline particles of the other.

This invention relates to condensing carding-engines which have a reciprocating motion imparted to the rubbers. Heretofore it has been the practice to make the bearing in which the shaft or spindle reciprocates of cast-iron and the shaft or spindle of steel and the feather of the latter of steel or wrought-iron. This shaft or spindle is horizontal, and, in addition to the work it has to perform, it is required by its position to sustain its weight upon its sides, which alone tends to wear them. Then, again, the crystalline formation of the metal forming the bearing in which the spindle reciprocates has been found to bite or wear the steel away to such an extent as to require every few months a new set of spindles, a spindle under such circumstances rarely wearing over nine months, even with clean work. Some difference will, of course, result from the dirty or cleanly character of the work done by the carding-engine; but nine months is the average extreme limit of the use of this shaft or spindle. The wear of these shafts or spindles causes the reciprocating rubbers of the card to be untrue with respect to each other, thus occasioning the ruin of the work done by them, and frequent breakage of that part of the apparatus.

The object of my invention is to overcome these difficulties and objections by making a more durable shaft or spindle, which I accomplish in great measure, first, by making the spindle or shaft of such form as to distribute the wear occasioned by having to sustain its own weight and the work it has to do evenly over several parts of its sides or surface; second, by making this shaft or spindle of metal having the same hard crystalline structure as the bearing in which it reciprocates. I have found after four years' use that my shafts or spindles so constructed have a smooth glassy surface, are not perceptibly worn, and have faithfully and continuously worked during all that period. On all kinds of work the adoption of my improved spindles has resulted in a saving of from twenty-five to fifty-four dollars per year upon each carding-engine to which they have been applied.

The old-fashioned feather is still employed by me when I use a spindle of the form shown in Fig. 1, and this results in the shaft or spindle being of cast metal and the feather of steel or iron. The latter two metals are of tougher or less brittle texture than the former. Consequently, if the spindle should crack across, the feather would hold it together, as said feather is tightly wedged in its groove in the spindle.

The shaft or spindle of a condensing or rubbing cylinder for carding-engines consists ordinarily of a light bar, to which the cylinder of tinned plate is soldered or otherwise secured. This bar, being turned by a pinion at one end, turns the rubber at the other end, thus forming a horizontal connecting-shaft, commonly called a "spindle." The rubber has a rapid reciprocating motion at the same time that it is revolving rapidly upon its axis.

Figure 2:
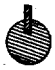
Figure 3:
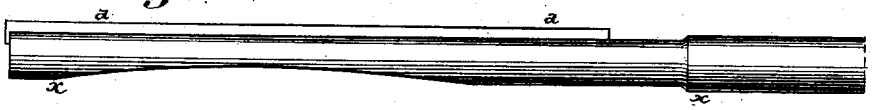
Figure 4:
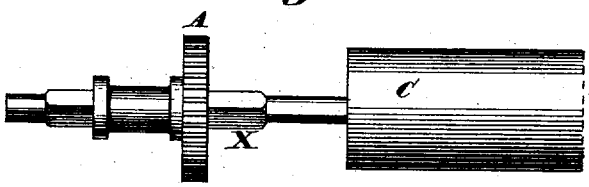
Figure 5:
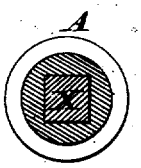

In the drawings, Figure 1 represents one end of an ordinary spindle in its normal condition. Fig. 2 is a cross-section on the line V W of Fig. 1. Fig. 3 shows a worn-out spindle. Fig. 4 is a side view of my polygonal shaft or spindle, (square,) showing also a part of the rubber and the pinion in which the shaft or spindle reciprocates; and Fig. 5, a cross-section of the shaft or spindle in the bearing in which it reciprocates.

*a*, Fig. 1, is the feather, and X the body of the shaft or spindle. A, Fig. 4, is the pinion which turns the shaft or spindle X, in center of which the latter reciprocates. C is the reciprocating rubber. The feather *a* is adapted to a groove in the hub of the driving wheel or pinion, which wheel or pinion drives the shaft or spindle, as at A, Fig. 4, though in Fig. 4 a polygonal (square) shaft or spindle, X, is shown. The feather *a* is only requisite when the shaft or spindle is round.

Fig. 3 shows a steel spindle worn out by the continuous friction of its cast-iron bearing—such wear as results from five to nine months usage. The delay and trouble of removing these spindles are a source of much annoyance and expense, as the detaching of the tin cylinders and securing them to new spindles require tedious manipulation. The old wrought-iron or steel spindle constantly required this attention.

I much prefer to make that part of the spindle which reciprocates upon or in its bearing of a polygonal shape or cross-section, rather than to make it round and depend upon its feather to stand the wear occasioned by the revolving motion of its bearing, as by the former shape the wear is evenly distributed to the corners of the polygonal sides. When the shaft or spindle is square or polygonal its bearing in which it reciprocates must be of corresponding shape.

I am well aware that an upright square spindle has been used in spinning-frames, as in English Patent No. 2,885 for 1856; also, that in cloth-cutting apparatus a triangular shaft extendible lengthwise in its bearings has been used. These I do not claim; but,

Having thus described my invention, what I claim as new, and desire to secure by Letters Patent, is—

1. The combination, in a carding-engine, of a condensing or rubber cylinder, a driving-wheel, and a polygonally-shaped horizontal shaft or spindle, the latter being adapted to be revolved and at the same time to be continuously reciprocated in a correspondingly polygonally-shaped bearing, said bearing and said shaft or spindle being of cast-iron or of metal of the same crystalline structure as cast-iron, and a continuously reciprocating rubber, substantially as and for the purposes described.

2. In a carding-engine, the combination of a continuously-reciprocating rubber, a driving-wheel to turn said rubber, and a horizontal shaft or spindle connecting the two together, said shaft or spindle and the bearing in which it reciprocates being both made of cast-iron, or both of metal having the same crystalline structure as cast-iron, whereby in the reciprocating action the tendency of the crystalline particles of cast metal in the bearing to wear the spindle will be resisted by the crystalline particles of the latter, substantially as and for the purposes described.

JAMES GREAVES.

Witnesses:

ALBERT E. ZACHERLE,
GEORGE H. SONNEBORN.